(12) United States Patent
Suzuki et al.

(10) Patent No.: US 7,988,388 B2
(45) Date of Patent: Aug. 2, 2011

(54) SPINDLE ATTACHMENT DEVICE FOR MACHINE TOOL

(75) Inventors: Masaharu Suzuki, Kanagawa (JP); Takashi Seto, Kanagawa (JP)

(73) Assignee: Makino J Co., Ltd., Kanagawa (JP)

( * ) Notice: Subject to any disclaimer, the term of this patent is extended or adjusted under 35 U.S.C. 154(b) by 1060 days.

(21) Appl. No.: 11/663,207

(22) PCT Filed: Sep. 22, 2005

(86) PCT No.: PCT/JP2005/018050
§ 371 (c)(1),
(2), (4) Date: Mar. 19, 2007

(87) PCT Pub. No.: WO2006/033466
PCT Pub. Date: Mar. 30, 2006

(65) Prior Publication Data
US 2007/0264095 A1 Nov. 15, 2007

(30) Foreign Application Priority Data
Sep. 24, 2004 (JP) .................................. 2004-277001

(51) Int. Cl.
*B23B 39/10* (2006.01)

(52) U.S. Cl. .......................... 408/124; 408/141; 470/903

(58) Field of Classification Search ................. 408/124, 408/141; 470/198, 903; *B23B 39/10*
See application file for complete search history.

(56) References Cited

U.S. PATENT DOCUMENTS

| | | | | |
|---|---|---|---|---|
| 3,871,498 A | * | 3/1975 | Kitaguchi | 192/48.91 |
| 3,946,844 A | * | 3/1976 | Johnson | 192/69.5 |
| 3,998,565 A | * | 12/1976 | Tanaka | 408/132 |
| 3,999,642 A | * | 12/1976 | Johnson | 192/21 |
| 4,014,421 A | * | 3/1977 | Johnson | 192/48.91 |
| 4,123,192 A | * | 10/1978 | Ruland | 408/133 |

(Continued)

FOREIGN PATENT DOCUMENTS
JP 47-19890 11/1972
(Continued)

OTHER PUBLICATIONS

Japanese Notice of Reasons for Rejection mailed Mar. 3, 2010, directed to counterpart Japanese Application No. 2004-277001; 4 pages.

*Primary Examiner* — Eric A Gates
(74) *Attorney, Agent, or Firm* — Morrison & Foerster LLP

(57) ABSTRACT

A spindle attachment device attached, for use, to a distal end of a spindle of a machine tool is provided. The spindle attachment device (11) includes a hollow casing (13) having an internal space; an input shaft (17) rotatably supported inside the casing; an output shaft (19) rotatably supported inside the casing; a coupling member (15) connected to the input shaft in order to join the input shaft to the spindle of the machine tool; a gear train (21) disposed between the input shaft and the output shaft in order to increase a rotation speed of the input shaft for a transmission to the output shaft; and a tap holder (25, 27) for mounting a tapping tool on the output shaft. The spindle attachment device increases the rotation speed of the spindle and transfers it to the tapping tool, and thus makes it possible to perform a tapping process on a workpiece at high speed, while maintaining the rotation speed of the spindle at a low level.

3 Claims, 1 Drawing Sheet

U.S. PATENT DOCUMENTS

| | | | | |
|---|---|---|---|---|
| 4,277,209 | A | * | 7/1981 | Benjamin et al. ............ 408/139 |
| 4,705,437 | A | * | 11/1987 | Johnson ........................ 408/139 |
| 4,832,542 | A | * | 5/1989 | Johnson et al. ............... 408/139 |
| 4,911,588 | A | * | 3/1990 | Ikemoto et al. ............... 408/137 |
| 5,096,343 | A | * | 3/1992 | Luu ............................... 408/134 |
| 5,203,651 | A | * | 4/1993 | Johnson ......................... 408/59 |
| 5,213,453 | A | * | 5/1993 | Eriksson ........................ 408/57 |
| 5,263,799 | A | * | 11/1993 | Blessing ....................... 408/139 |
| 5,419,661 | A | * | 5/1995 | Meachum ....................... 408/57 |
| 5,628,593 | A | * | 5/1997 | Johnson ........................ 408/139 |
| 5,865,575 | A | * | 2/1999 | Johnson ........................ 408/139 |
| 6,340,276 | B1 | * | 1/2002 | Watzke ............................ 408/10 |
| 2006/0051170 | A1 | * | 3/2006 | Johnson et al. ................ 408/56 |
| 2006/0285933 | A1 | * | 12/2006 | Johnson et al. ............... 408/141 |

FOREIGN PATENT DOCUMENTS

| | | | | |
|---|---|---|---|---|
| JP | 61-50622 | | | 4/1986 |
| JP | 01016315 | A | * | 1/1989 |
| JP | 1-264748 | | | 10/1989 |
| JP | 6-218625 | | | 8/1994 |
| JP | 06218625 | A | * | 8/1994 |
| JP | 7-185975 | | | 7/1995 |
| JP | 07185975 | A | * | 7/1995 |

* cited by examiner

SPINDLE ATTACHMENT DEVICE FOR MACHINE TOOL

TECHNICAL FIELD

The present invention relates to a spindle attachment device that is attached, for use, to a distal end of a spindle provided in a machine tool.

BACKGROUND ART

Mass-produced products are generally processed in a special-purpose processing line in which multiple special-purpose processing machines, each of which is specialized to process a single component, are provided. In the special-purpose processing line, when the design of the component to be manufactured is changed, it may be required to replace any of the special-purpose processing machines to another one. On the other hand, in order to accommodate a diversification of products and a change in market needs, a mixed processing line that can simultaneously process different components has been widely used.

In the mixed processing line, not only the special-purpose processing machines but also general-purpose machining centers are provided, so as to increase flexibility of the processing line. Recently, some mixed processing lines may be comprised of only the general-purpose machining centers. Various processes may be performed by the general-purpose machining center. Japanese Unexamined Utility Model Publication (Kokai) No. 61-50622 (JP-U-61-50622) discloses, as a technique for increasing the processing flexibility in the machining center, a tap holder that is mounted on a spindle of the machining center so as to enable a tapping process.

However, in comparison with a special-purpose tapping machine equipped with a multi-axis head, the tap holder disclosed in JP-U-61-50622 cannot obtain higher processing efficiency. In this regard, considering the fact that the rotation speed and feed speed of the spindle in the special-purpose processing machine with the multi-axis head are higher than those of the common general-purpose machining center, it may be expected that the processing efficiency comparable to that of the special-purpose processing machine can be obtained by increasing the rotation speed of the spindle in the general-purpose machining center. For example, some recent heavy-duty (high-speed rotation and high-speed feed) drills can reach a cutting speed of 350 m/min and a feed speed of 1 mm/rotation.

However, when the rotation speed of the spindle in the general-purpose machining center is increased, a problem may arise in that a longer start-up time for the operation of the spindle is required. Thus, even though the processing speed is increased by increasing the rotation speed of the spindle, the start-up time becomes longer, and as a result, processing efficiency cannot be improved very much. In particular, in a tapping process, it is necessary to reverse the rotation of the spindle in order to withdraw a tapping tool from a workpiece, and thus to frequently switch the rotational direction of the spindle between the forward and reverse directions, and therefore, processing efficiency tends to be remarkably reduced.

DISCLOSURE OF THE INVENTION

It is an object of the present invention to provide a spindle attachment device that can reduce start-up time for a spindle while enabling a tapping process at high-speed rotation.

In order to accomplish the above object, the present invention provides a spindle attachment device attached, for use, to a distal end of a spindle of a machine tool, the machine tool including the spindle rotatably supported about a predetermined axis and feeding means for relatively moving the spindle with respect to a workpiece at least in a direction of the axis, characterized in that the spindle attachment device comprises a hollow casing having an internal space; an input shaft rotatably supported inside said casing; an output shaft rotatably supported inside said casing; joining means connected to said input shaft, said joining means joining said input shaft to said spindle of said machine tool; transmitting means disposed between said input shaft and said output shaft, said transmitting means increasing a rotation speed of said input shaft for a transmission to said output shaft; and a tap holder for mounting a tapping tool on said output shaft; wherein a rotation speed of said spindle is increased and transmitted to said tapping tool, so that a tapping process is performed on the workpiece.

BRIEF DESCRIPTION OF THE DRAWINGS

The above and other objects, features and advantages of the present invention will become more apparent from the following description of the preferred embodiment in conjunction with the accompanying drawings, in which.

BEST MODES FOR CARRYING OUT THE INVENTION

Figure 1:
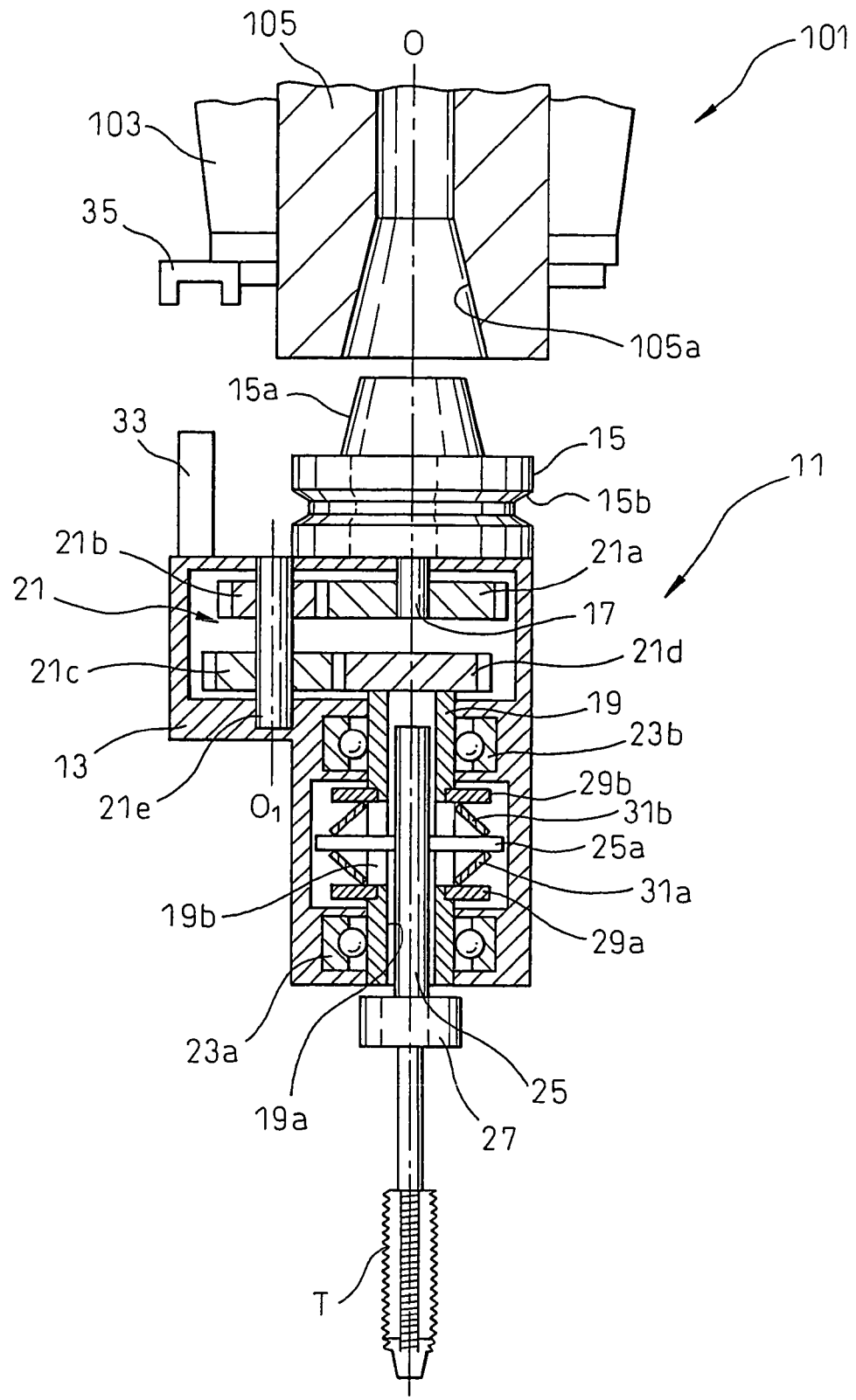
FIG. 1 is a sectional view of a spindle attachment device according to a preferred embodiment of the present invention.

The preferred embodiment of the present invention will be described below with reference to FIG. 1.

FIG. 1 shows a tapping device 11, as an example of a spindle attachment device. The tapping device 11 is attached, for use, to a distal end of a spindle 105 rotatably supported about a central axis O within a housing 103 of a spindle head of a machine tool 101, and increases rotation speed of the spindle 105 and transmits it to a tool (tapping tool T, in this embodiment). As an example, the machine tool 101 may have a configuration of a general-purpose machining center that is equipped with a feeding device for relatively moving the spindle 105 with respect to a table (not shown) disposed in front of the spindle, i.e., below the spindle in FIG. 1, at least in a direction of a Z axis parallel to the central axis O, and more preferably in three rectangular directions of X, Y and Z axes.

The tapping device 11 includes a hollow casing 13 having an internal space; an input shaft 17 and an output shaft 19 that are provided rotatably with respect to the casing 13; a coupling member 15 as joining means, connected to the input shaft 17, for joining the input shaft 17 to the spindle 105 of the machine tool 101; a gear train 21 as transmitting means, disposed between the input shaft 17 and the output shaft 19, for increasing a rotation speed of the input shaft 17 and transmitting it to the output shaft 19; and a tap holder for mounting the tool T on the output shaft 19.

The coupling member 15 may have a configuration similar to that of a tail end portion of a tool holder having a tapered shank, which has been widely used in the field of machine tools, and is secured to the distal end portion of the spindle 105 by tool mounting means such as a draw bar (not shown) provided in the spindle 105. In this embodiment, the coupling member 15 includes a tapered portion 15a adapted to be fitted at least into a tapered bore 105a formed at the distal end of the spindle 105, and means for securing the coupling member 15 to the distal end portion of the spindle 105 while cooperating with the tool mounting means built into the spindle 105. The coupling member 15 is preferably provided with a circumferential groove 15b adapted to be engaged with a changing arm (not shown) of an automatic tool changer (not shown) for the machine tool 101. Therefore, the tapping device 11 can be mounted on the distal end of the spindle 105 by using the automatic tool changer.

The input shaft 17 is connected to the coupling member 15 coaxially therewith, and when the tapered portion 15a of the coupling member 15 is attached to the tapered bore 105a of the spindle 105, rotates about a central axis identical to the central axis O of the spindle 105. The output shaft 19 is supported, on the casing 13 through bearings 23a and 23b, rotatably about a central axis identical to the central axis of the input shaft 17. The output shaft 19 is provided with a bore 19a penetrating therethrough along the central axis of the output shaft 19, and a pair of slots 19b extending in a direction parallel to the central axis of the output shaft 19. Each slot 19b is formed to radially penetrate between an outside surface of the output shaft 19 and the bore 19a.

The gear train 21 includes an intermediate shaft 21e supported on the casing 13 in a manner rotatable about an axis $O_1$ parallel to the central axes of the input and output shafts 17, 19; an input gear 21a connected to an end of the input shaft 17 opposite to the coupling member 15; a first intermediate gear 21b connected to the intermediate shaft 21e for a rotation together with the intermediate shaft 21e and engaged with the input gear 21a; a second intermediate gear 21c connected to the shaft 21e for a rotation together with the intermediate shaft 21e; and an output gear 21d connected to a proximal end portion of the output shaft 19 and engaged with the second intermediate gear 21c.

The tap holder includes a rod-like shank 25, and a collet chuck 27 as attachment means for attaching the tapping tool T to a distal end of the shank 25. The shank 25 is fitted into the bore 19a in a manner movable along the central axis of the output shaft 19. The shank 25 is provided with a pair of drive pins 25a extending in directions radially opposite to each other, as protruding portions protruding radially outward from the inside of the bore 19a through the pair of slots 19b of the output shaft 19. In this embodiment, each drive pin 25a is a cylindrical member and has a diameter enabling the pin to shift along the central axis of the output shaft 19 while contacting with lateral inner surfaces of each slot 19b.

A pair of coned disc springs 31a and 31b are provided, for the output shaft 19, as elastic holding means adapted to be engaged with the drive pins 25a protruding from the outside surface of the output shaft 19 and to hold the tap holder, by an elastic force, at a predetermined position along the central axis of the output shaft 19. The disc springs 31a, 31b are restrictively arranged at predetermined positions on the output shaft 19 by snap rings 29a, 29b.

The casing 13 is provided with a detent 33 for preventing the tapping device 11 from rotating about the central axis O when the spindle 105 rotates. On the contrary, the housing 103 of the spindle head of the machine tool 101 is provided with an anchor member 35 adapted to be engaged with the detent 33.

The mode of operation of the tapping device 11, according to the illustrated embodiment, will be described below.

As already described, the tapping device 11 is mounted on the distal end of the spindle 105, by using the tool mounting means built into the spindle 105, with the tapered portion 15a of the coupling member 15 being fitted into the tapered bore 105a formed at the distal end of the spindle 105. When the tapping device 11 is mounted on the distal end of the spindle 105, the detent 33 is engaged with the anchor member 35 provided on the housing of the spindle head, in order to prevent the tapping device 11 from rotating about the central axis O. The tapping device 11 may be mounted on the spindle 105 by using the automatic tool changer (not shown) of the machine tool 101. After the tapping device 11 is mounted on the spindle 105, the tapping tool T may be attached to the collet chuck 27 of the tap holder is done manually by an operator. In this connection, the tapping device 11 having the tapping tool T attached to the tap holder may be stored in a tool magazine of the automatic tool changer, and the tapping device 11 having the tapping tool T attached thereto may be mounted on the spindle 105 by the automatic tool changer.

In a state where the tapping device 11 is mounted on the distal end of the spindle 105, when the spindle 105 rotates, the rotation of the spindle 105 is transmitted to the output shaft 19 through the coupling member 15, the input shaft 17, the input gear 21a, the first intermediate gear 21b, the intermediate shaft 21e, the second intermediate gear 21c and the output gear 21d. In this connection, as understood from FIG. 1, the gear train 21 is arranged in order to increase the rotation speed of the spindle 105 in accordance with the gear ratios between the respective gears in the gear train 21, and thus to transmit high speed rotation to the output shaft 19. As a result, it is possible to perform a tapping process at high speed while maintaining the rotation speed of the spindle 105 at a low level.

When the tapping tool T is fed, by using an NC unit (not shown) of the machine tool 101, in a Z-axis direction toward the inside of a pilot hole of a workpiece (not shown) while synchronizing with the rotation of the output shaft 19, an internal thread is formed on an inner surface of the pilot hole. This processing operation can be performed, through the NC unit of the machine tool 101, by using rotation-speed sensing means such as a rotary encoder provided for the spindle 105 and Z-axis position sensing means such as a linear scale provided for the Z axis. In this connection, the acceleration ratio of the tapping device 11 should be taken into account in an NC program. Alternatively, the rotation speed of the tap holder or the output shaft 19 may be detected directly. Further, a so-called direct tapping tool, configured by combining a drill and a tap, may be used as the tapping tool T, so that the internal thread can be directly formed by drilling a surface of the workpiece without forming a pilot hole in the workpiece.

After the internal thread having a desired depth is formed, the spindle 105 is operated to rotate in a reverse direction, and to feed the tapping tool T in a retracting direction along the Z axis while synchronizing with the rotation of the spindle 105, so that the tapping tool T is withdrawn from the internal thread formed in the workpiece. When the spindle 105 rotates in the reverse direction, due to a backlash in the gear train 21, it may be difficult to establish perfect synchronization between the rotation and z-axis feeding of the output shaft 19, i.e., the tapping tool T. In the illustrated embodiment, the output shaft 19 is held at a predetermined position along the central axis of the output shaft 19 by the elastic force of the disc springs 31a, 31b, so that, even if rotation is not perfectly synchronized with the linear feed, it is possible to withdraw the tapping tool T without damaging the resultingly formed thread or the tapping tool T. In other words, the output shaft 19 shows a floating motion, so as to absorb operational errors that arise due to factors preventing synchronization of rotation and feeding.

As described above, by using the tapping device 11 according to this embodiment, it is possible to perform the tapping process at high speed while maintaining the rotation speed of the spindle 105 at a low level. For example, when the acceleration ratio of the gear train 21 is set to 6:1, the tapping process can be performed at 12,000 min$^{-1}$ while maintaining the rotation speed of the spindle 105 at 2,000 min$^{-1}$, and therefore, the spindle 105 can rapidly rotate in both the forward and reverse directions. For example, a start-up time of the spindle 105 required from its stationary state to 2,000 min$^{-1}$ is about 0.1 sec., whereas the start-up time up to 12,000 min$^{-1}$ is about 0.8 sec. Accordingly, by using the tapping device 11 of this embodiment, even in the general-purpose machining center, it is possible to perform a tapping process in no way inferior to that in a conventional special-purpose tapping machine having a multi-axis head.

As can be seen from the above description, according to the spindle attachment device of the present invention, the rotation speed of the spindle of the machine tool is increased and the high speed rotation is transmitted to the output shaft carrying the tool, and therefore, the tapping process can be performed at high speed while maintaining the rotation speed of the spindle at a low level. As a result, the time required for starting up, stopping and reversing of the spindle can be reduced, and processing efficiency of the machine tool can be improved.

While the present invention has been described with reference to the preferred embodiment thereof, it will be understood by those skilled in the art that various modifications and changes may be made without departing from the spirit and scope of the appended claims.

The invention claimed is:

1. A spindle attachment device attached, for use, to a distal end of a spindle of a machine tool, the machine tool including the spindle rotatably supported about a predetermined axis and a feeding member configured to relatively move the spindle with respect to a workpiece at least in a direction of the axis, the spindle attachment device comprising:
   a hollow casing having an internal space;
   an input shaft rotatably supported inside said casing;
   an output shaft rotatably supported inside said casing;
   a joining member connected to said input shaft, said joining member joining said input shaft to said spindle of said machine tool;
   a transmitting member disposed between said input shaft and said output shaft, said transmitting member increasing a rotation speed of said input shaft for a transmission to said output shaft; and
   a tap holder configured to mount a tapping tool on said output shaft;
   wherein the spindle attachment device is configured to increase a rotation speed of said spindle and transmit it to said tapping tool so that a tapping process is performed on the workpiece,
   wherein said tap holder is attached to said output shaft relatively movably with respect to said output shaft along a central axis of said output shaft; and
   wherein said spindle attachment device further comprises elastic holding means for holding said tap holder, by an elastic force, at a predetermined position along said central axis of said output shaft.

2. A spindle attachment device as set forth in claim 1, wherein said output shaft is provided with a bore formed along said central axis of said output shaft; and wherein said tap holder includes a rod-like shank fitted into said bore of said output shaft in a manner as to be movable along said central axis and an attachment member configured to attach the tapping tool to a distal end of said shank.

3. A spindle attachment device as set forth in claim 2, wherein said output shaft is provided with a slot extending in a direction parallel to said central axis of said output shaft and formed to penetrate between an outside surface of said output shaft and said bore; wherein said tap holder includes a protruding portion protruding radially outward from inside said bore through said slot; and wherein said elastic holding means includes a pair of coned disc springs urging said protruding portion in mutually opposing directions along said central axis of said output shaft.

* * * * *